US009891830B2

(12) United States Patent
Dolph et al.

(10) Patent No.: US 9,891,830 B2
(45) Date of Patent: *Feb. 13, 2018

(54) TIER BASED DATA FILE MANAGEMENT

(71) Applicant: INTERNATIONAL BUSINESS MACHINES CORPORATION, Armonk, NY (US)

(72) Inventors: Blaine H. Dolph, Western Springs, IL (US); Nataraj Nagaratnam, Cary, NC (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,379

(22) Filed: Apr. 5, 2017

(65) Prior Publication Data
US 2017/0206014 A1 Jul. 20, 2017

Related U.S. Application Data

(63) Continuation of application No. 14/547,694, filed on Nov. 19, 2014, now Pat. No. 9,658,781.

(51) Int. Cl.
G06F 3/06 (2006.01)

(52) U.S. Cl.
CPC .......... G06F 3/0604 (2013.01); G06F 3/064 (2013.01); G06F 3/0643 (2013.01); G06F 3/0647 (2013.01); G06F 3/0652 (2013.01); G06F 3/0685 (2013.01)

(58) Field of Classification Search
CPC .... G06F 3/0604; G06F 3/0647; G06F 3/0652; G06F 3/064; G06F 3/0685
See application file for complete search history.

(56) References Cited

U.S. PATENT DOCUMENTS

| 8,166,257 B1 | 4/2012 | Holl, II et al. |
| 8,352,429 B1 | 1/2013 | Mamidi et al. |
| 2006/0041719 A1 | 2/2006 | Chui et al. |
| 2010/0281230 A1 | 11/2010 | Rabii et al. |
| 2011/0202732 A1 | 8/2011 | Montgomery |

(Continued)

FOREIGN PATENT DOCUMENTS

WO 2011030290 3/2011

OTHER PUBLICATIONS

Gilge et al.; Flash or SSD: Why and When to Use IBM FlashSystem; IBM Redpaper; Jun. 26, 2013; 18 pages.

(Continued)

Primary Examiner — Reginald Bragdon
Assistant Examiner — Mehdi Namazi
(74) Attorney, Agent, or Firm — Schmeiser, Olsen & Watts; Michael A. Petrocelli

(57) ABSTRACT

A hierarchal storage management method is provided. The method includes detecting a first portion of a first file being deleted from a hybrid storage device including a hard disk drive (HDD) memory device, a solid state drive (SSD) memory device, and an archival storage memory device. A first set of memory blocks associated with the first portion of the first file is identified. The first set of memory blocks are determined to reside on the SSD memory device. In response, the first set of memory blocks are transferred from the SSD memory device to a first portion of the hybrid storage device.

20 Claims, 9 Drawing Sheets

(56) References Cited

U.S. PATENT DOCUMENTS

| | | |
|---|---|---|
| 2012/0254506 A1 | 10/2012 | Sauber et al. |
| 2013/0073783 A1 | 3/2013 | Cao et al. |
| 2015/0012496 A1 | 1/2015 | Minamiura |
| 2016/0139821 A1 | 5/2016 | Dolph et al. |
| 2016/0139835 A1 | 5/2016 | Fiebrich-Kandler et al. |
| 2016/0188467 A1 | 6/2016 | Sauber et al. |

OTHER PUBLICATIONS

Krutov, Ilya; The Benefits of IBM FlashCache Storage Accelerator in Enterprise Solutions; IBM Redpaper, Mar. 7, 2014; 30 pages.

Liu et al.; RAF: A Random Access First Cache Management to Improve SSD-Based Disk Cache; 2010 Fifth IEEE International Conference on Networking, Architecture, and Storage; Jul. 15-17, 2010; 21 pages.

Friedman, Mark J.; List of IBM Patents or Patent Applications Treated as Related; Apr. 4, 2017; 1 page.

| File | File Block | Logical Block No |
|---|---|---|
| File1 | 1 | L100 |
| File1 | 2 | L101 |
| File2 | 1 | L200 |
| File2 | 2 | L201 |
| File3 | 1 | L300 |
| File3 | 2 | L301 |
| File3 | 3 | L302 |
| File2 | 4 | L303 |

| BlockNo | AccessCount |
|---|---|
| L 100 | 100 |
| L 101 | 120 |
| L 200 | 50 |
| L 201 | 110 |
| L 300 | 25 |
| L 301 | 30 |
| L 302 | 25 |
| L 303 | 30 |

TIER BASED DATA FILE MANAGEMENT

This application is a continuation application claiming priority to Ser. No. 14/547,694 filed Nov. 19, 2014, now U.S. Pat. No. 9,658,781 issued May 23, 2017.

FIELD

The present invention relates generally to a method for managing storage on a hybrid memory device, and in particular to a method and associated system for transferring memory blocks between tiers of a hybrid memory device.

BACKGROUND

A general policy based placement and migration of data across tiers can be an efficient way to store data. General migration of data, however, may not include an efficient use of storage if append and/or delete operations are not performed in an efficient manner.

Current multi-tier architecture comprises policies associated with data placed on a solid state drive (SSD) tier. When a typical application accesses a file (or portion of the file), the application expects a same access latency value across the tier in association with a stable performance scenario. During a typical append or add block operation, blocks may be placed on an inefficient tier based on differing access counts across new blocks thereby resulting in overall performance degradation and unexpected consequences in user program behavior. Likewise, deleted blocks may result in underutilization of SSD space.

In one example, mechanisms may enable a process for moving data in a hybrid aggregate associated with relocating data between tiers of storage media in a hybrid storage aggregate encompassing multiple tiers of heterogeneous physical storage media including a file system to automatically relocate the data between tiers. This example recites traditional data movement across SSD and HDD tiers based on set of standard policies. However, the example does not mention a file append and/or delete block mechanism. Therefore, an enabled application may degradation while accessing newly appended blocks. Likewise, deleted blocks will unnecessarily occupy SSD and HDD tiers.

In another example, data movement between an SSD and HDD comprises a relatively static process. The static process art does not consider whether data blocks belong to a single file or a movement file associated with deleted blocks of an HDD tier. Additionally, newly appended file blocks are not considered for the SSD tier.

One problem created by current multi-tier architecture includes the lack of file operation level awareness and the consideration of a file append/delete operation in order to place new data blocks on a hot tier or to remove deleted data blocks from hot tier. Additionally, the current multi-tier architecture does not allow for the placement of new data blocks by considering a set of existing data blocks comprising similar access behavior.

Accordingly, there exists a need in the art to overcome at least some of the deficiencies and limitations described herein above.

SUMMARY

A first aspect of the invention provides a hierarchal storage management method comprising: detecting, by a computer processor of a computing system, a first portion of a first file being deleted from a hybrid storage device comprising a hard disk drive (HDD) memory device, a solid state drive (SSD) memory device, and an archival storage memory device; identifying, by said computer processor, a first set of memory blocks associated with said first portion of said first file; determining, by said computer processor, that said first set of memory blocks reside on said SSD memory device; and transferring, by said computer processor, said first set of memory blocks from said SSD memory device to a first portion of said hybrid storage device.

A second aspect of the invention provides a computing system comprising a computer processor coupled to a computer-readable memory unit, the memory unit comprising instructions that when executed by the computer processor implements a method comprising: detecting, by the computer processor, a first portion of a first file being deleted from a hybrid multitier storage device comprising a hard disk drive (HDD) memory device, a solid state drive (SSD) memory device, and an archival storage memory device; identifying, by the computer processor, a first set of memory blocks associated with the first portion of the first file; determining, by the computer processor, that the first set of memory blocks reside on a high performance tier of the SSD memory device; notifying, by the computer processor, the hybrid multitier storage device that the first portion of the first file is being deleted; and transferring, by the computer processor, the first set of memory blocks from the SSD memory device to a first portion of the hybrid storage device.

A third aspect of the invention provides a computer program product for software installation, the computer program product comprising: one or more computer-readable, tangible storage devices; program instructions, stored on at least one of the one or more storage devices, to detect a first portion of a first file being deleted from a hybrid multitier storage device comprising a hard disk drive (HDD) memory device, a solid state drive (SSD) memory device, and an archival storage memory device; program instructions, stored on at least one of the one or more storage devices, to identify a first set of memory blocks associated with the first portion of the first file; program instructions, stored on at least one of the one or more storage devices, to determine that the first set of memory blocks reside on a high performance tier of the SSD memory device; program instructions, stored on at least one of the one or more storage devices, to notify the hybrid multitier storage device that the first portion of the first file is being deleted; and program instructions, stored on at least one of the one or more storage devices, to transfer the first set of memory blocks from the SSD memory device to a first portion of the hybrid storage device.

The present invention advantageously provides a simple method and associated system capable of migrating data across tiers of a multi-tier storage architecture.

BRIEF DESCRIPTION OF THE DRAWINGS

FIG. 3A illustrates a file block association table, in accordance with embodiments of the present invention.

FIG. 3B illustrates a multi-tier access information table, in accordance with embodiments of the present invention.

DETAILED DESCRIPTION

Figure 1:
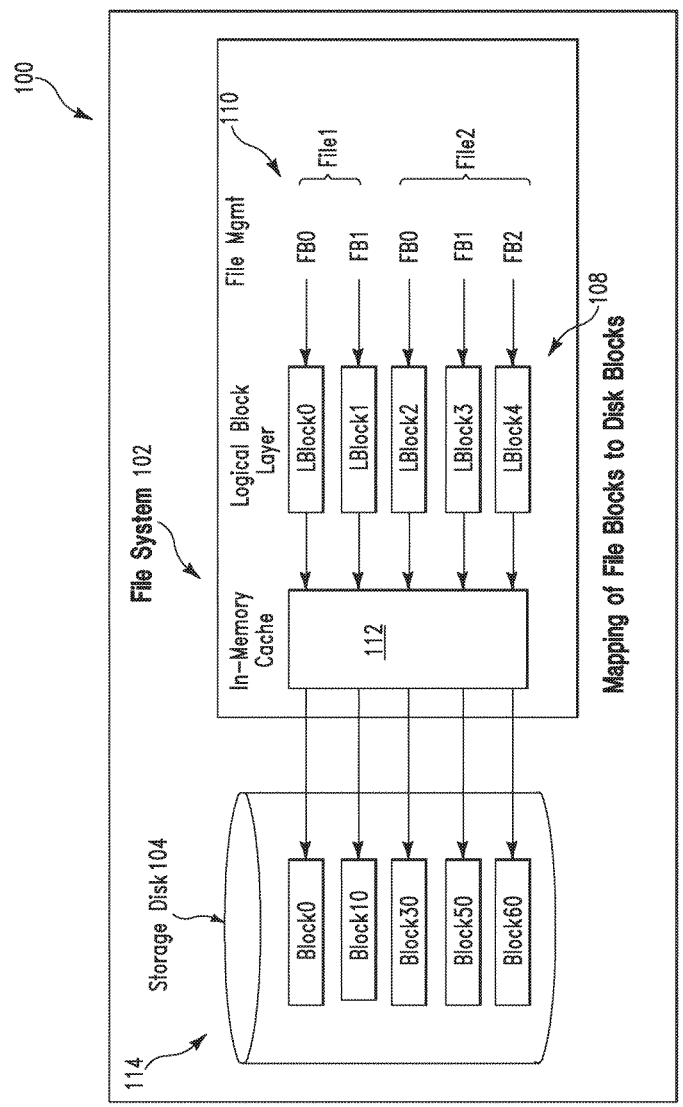
FIG. 1 illustrates a data storage management system, in accordance with embodiments of the present invention.

FIG. 1 illustrates a data storage management system 100, in accordance with embodiments of the present invention. As described in the BACKGROUND section above, general policy based placement and migration of data across tiers can be an efficient way to store data. General migration of data, however, may not enable an efficient use of storage if append and/or delete operations are not performed in an efficient manner. Additionally, general policy based placement and migration of data across tiers does not allow for the placement of new data blocks by considering a set of existing data blocks comprising similar access behavior.

System 100 enables a hierarchical storage management process with respect to hybrid drives (i.e., storage devices combining SSD and HDD drives). System 100 enables a process for transferring memory blocks between SSD and HDD drives in response to editing a frequently used file.

System 100:
1. Detects a portion of a file being deleted or truncated.
2. Identifies a first set of memory blocks corresponding to the portion of the file being deleted or truncated.
3. Determines whether the first set of memory blocks resides in SSD and transfers the first set of memory blocks to HDD or archival storage.

Additionally, system 100:
1. Detects a portion of a file being added or appended.
2. Identifies a second set of memory blocks corresponding to the portion of the file being added or appended.
3. Determines an access count for the second set of memory blocks and (in response to the access count reaching a predetermined threshold) transfers the second set of memory block to SSD or alternative high performance storage devices.

The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Data storage management system 100 comprises a storage disk 104 connected to a file system 102. A file system is defined herein as a means for naming files and placing the named files in storage and retrieval. File system 102 is divided into a user component and a storage component. The user component is responsible for managing: files within directories, file path traversals, and user access to a file. The storage component of file system 102 determines how a file is physically stored on storage disk 104.

File system 100 comprises file blocks 110 mapped to logical blocks 108. Logical blocks 108 are mapped to physical blocks 114. A logical to physical mapping layer causes a file management process to be independent from a storage management process. File system 100 illustrates a File1 (of file blocks 110) comprising two blocks FB0 and FB1 mapped to logical blocks LBlock0 and LBlock1, respectively. Logical blocks: LBlock0 and LBlock1 are mapped to physical blocks: Block0 and Block10, respectively. Similarly, file system 100 illustrates File2 (of file blocks 110) comprising file blocks FB0, FB1, and FB 2 mapped to logical blocks LBlock2, LBlock3, and LBlock4, respectively. Logical blocks LBlock2, LBlock3, and LBlock4 blocks are mapped to physical blocks: Block30, Block50 and Block60, respectively. The data blocks are stored within in-memory cache 112. During a first read operation, data is copied from storage disk 104 to in-memory cache 112. Subsequent accesses on with respect to the bock are retrieved from in-memory cache 112.

Figure 2A:
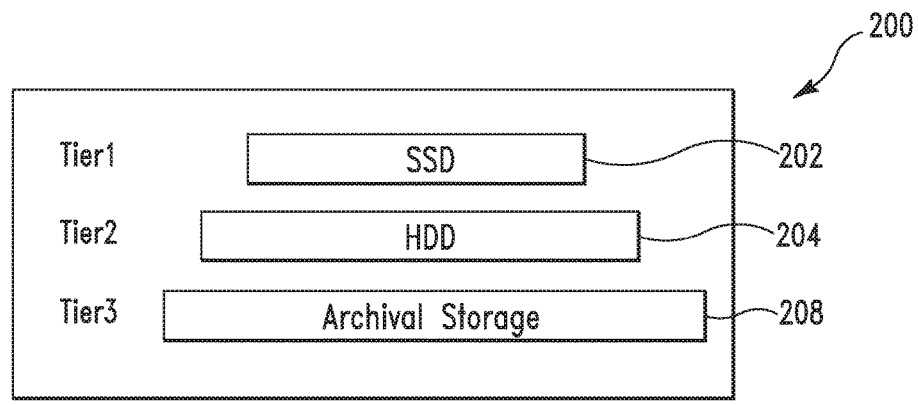
FIG. 2A illustrates a multi-tiered storage system, in accordance with embodiments of the present invention.

FIG. 2A illustrates a multi-tiered storage system 200, in accordance with embodiments of the present invention. Multi-tiered storage system 200 executes a storage method for storing data on various types of storage devices 202, 204, and 208 based on criteria such as: access, frequency of use, and security and data recovery requirements. For example, frequently accessed response time sensitive data (e.g., by an application) may be stored on a solid state drive (e.g., SSD 202). Alternatively, rarely accessed data comprising a higher response time may be stored on high capacity 7.2K RPM drives. A cost per Gigabyte of storage is higher for SSDs than it is for the 7.2K RPM drives. Multi-tiered storage system 200 identifies data benefiting from higher cost/higher performance storage tiers.

Figure 2B:
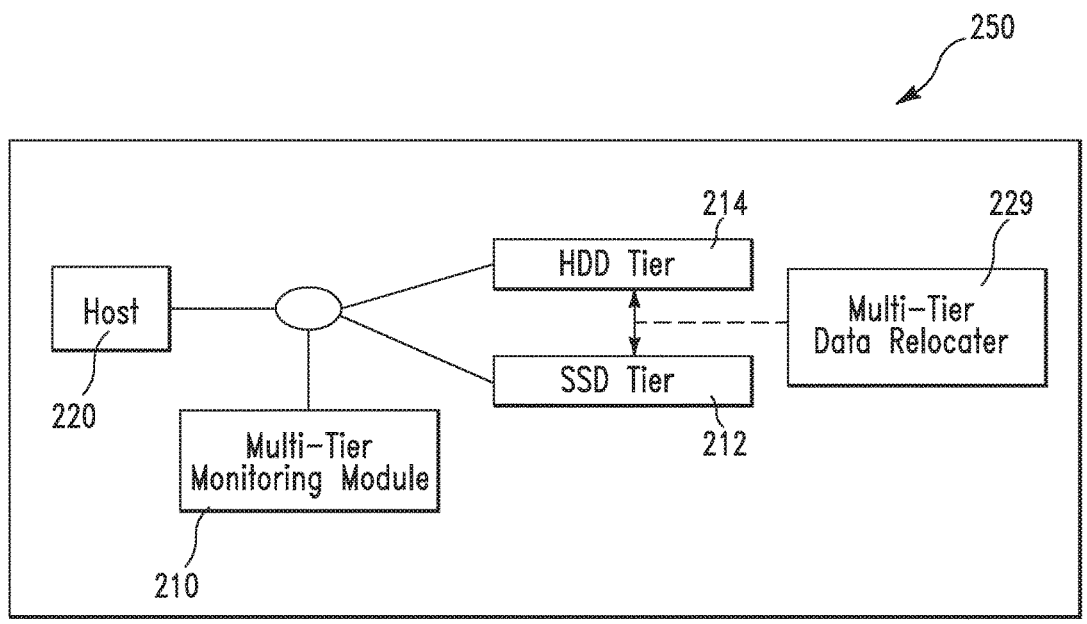
FIG. 2B illustrates an alternative multi-tiered monitoring system, in accordance with embodiments of the present invention.

FIG. 2B illustrates a multi-tiered monitoring system 250, in accordance with embodiments of the present invention. Multi-tiered monitoring system 250 comprises a host 220, a monitoring module 210, an HDD tier 214, an SDD tier 212, and a multitier data relocator module 224. Monitoring module 210 monitors input/outputs performed with respect to disk blocks of HDD tier 214 and SDD tier 212. For each disk block, heat information (in the form of an access count) is maintained. Multitier data relocator module 224 executes a process for moving data between HDD tier 214 and SDD tier 212. Physical blocks comprising an access count greater than a specified threshold is determined to be hot and therefore the aforementioned physical blocks are moved from HDD tier 214 to SSD 212 tier. If SSD tier 212 comprises less hot blocks than the specified threshold, the physical blocks are moved in reverse to HDD tier 214.

Multi-tiered monitoring system 250 enables a process for managing high performance tiers in multi-tier architecture by influencing heat map information. When existing physical blocks are removed from the file as part of block delete or truncate operation, a file system may determine if the physical blocks are occupying a high performance SSD tier. Additionally, the file system may generate a notification associated with an eviction process with respect to a multi-tier module. When new physical blocks are added to a file as part of an append or add operation, the file system determines a set of existing physical blocks comprising similar access behavior to the newly added physical blocks. A set of existing physical blocks (comprising similar access behavior to the new physical blocks) may be determined by considering an application performing the append or add operation the file. Additionally, the file system may monitor a first few accesses with respect to the new physical blocks and determine existing physical blocks accessed with the new data blocks.

Multi-tiered monitoring system 250 enables a process for managing of high performance tiers in a multi-tier architecture by influencing heat map information such that:
1. When existing physical blocks are removed from a file as part of block delete or truncate operation, the file system determines if the physical blocks are occupying high performance SSD tier and generates a notification associated with an eviction process with respect to a multi-tier module.
2. When new physical blocks are added in the file as part of append or add operation, the file system determines a set of existing physical blocks comprising similar access behavior. The aforementioned information is provided to the multi-tier monitoring for assigning a heat map count to new physical blocks comprising similar access behavior to the existing physical blocks.

A set of existing physical blocks comprising similar access behavior (i.e., to the new physical blocks) may be determined by:
1. Considering an application performing an append or add operation.
2. Monitoring a first few access attempts with respect to new data blocks and determining existing physical blocks accessed with the new physical blocks.

The following example describes an implementation scenario associated with a physical block removal process:
A file system executes the following system calls:
1. TRUCATE(fileID, newSize)—defining a new reduced size of a file.
2. DELETE_FILE_BLOCKS(file ID, List of blocks to be removed from the file).

The file system calls a list of physical blocks removed from the given file. The list is stored in the form of DELETE_BLOCK_LIST. The list is passed to a multi-tier module. A multi-tier relocation module determines if any of the physical blocks from the list is currently occupying a high performance SSD tier. If any of the physical blocks from the list are currently occupying a high performance SSD tier, the physical blocks will be evicted from the SSD tier and multi-tier monitoring module 210 retrieves physical blocks eligible to be placed on an SSD space to fill in a new free space.

The following example describes an implementation scenario associated with a physical block addition process:
A file system executes the following system calls:
1. APPEND(fileID, No of NewBlocks)—defining a new reduced size of a file.
2. WRITE(fileID, list of blocks with offset beyond current file size)
3. ADD_FILE_BLOCKS(file ID, List of blocks added in the file)

The file system calls a list of physical blocks that are newly added to the given file. The list is stored in the form of ADD_BLOCK_LIST. For each physical block from the ADD_BLOCK_LIST, the file system generates: SIMILAR_ACCESS_BEHAVIOUR_BLOCK_LIST comprising existing physical blocks. The list may be determined based on an application adding a given physical block.

For each physical block:
<NewBlockNo, SIMILAR_ACCESS_BEHAVIOUR_BLOCK_LIST> is passed to a multi-tier module. A multi-tier relocation module" retrieves AVERAGE_HEAT as average of heat values for all physical blocks from the SIMILAR_ACCESS_BEHAVIOUR_BLOCK_LIST.

A heat value is assigned to the NewBlockNo in the mulit-tier monitoring module table. Based on the heat value, it is determined if NewBlock is eligible for placement on the SSD tier. If NewBlock is eligible for placement on the SSD tier, an existing block from the SSD tier (comprising a least access count) is moved to the HDD tier and NewBlock is placed on SSD tier.

FIG. 3A illustrates a file block association table 300, in accordance with embodiments of the present invention. File block association table 300 is maintained by file system 102 of FIG. 1. File block association table 300 comprises associations between file blocks and logical blocks. For example, a File1 comprises a first file block stored on a logical block L100. Likewise, File1 comprises a second file block stored on a logical block L101. During append or new block add operation, entries are added to file block association table 300 for a given file. During a truncate or delete operation, entries are removed from the table for a given file.

FIG. 3B illustrates a multi-tier access information table 304, in accordance with embodiments of the present invention. Multi-tier access information table 304 is maintained by multi-tier monitoring module 210 of FIG. 2B. Multi-tier access information table 304 comprises an entry for every block stored on a HDD tier. Multi-tier access information table 304 may include per block or extent level entries where extent is set of contiguous blocks.

Figure 4:
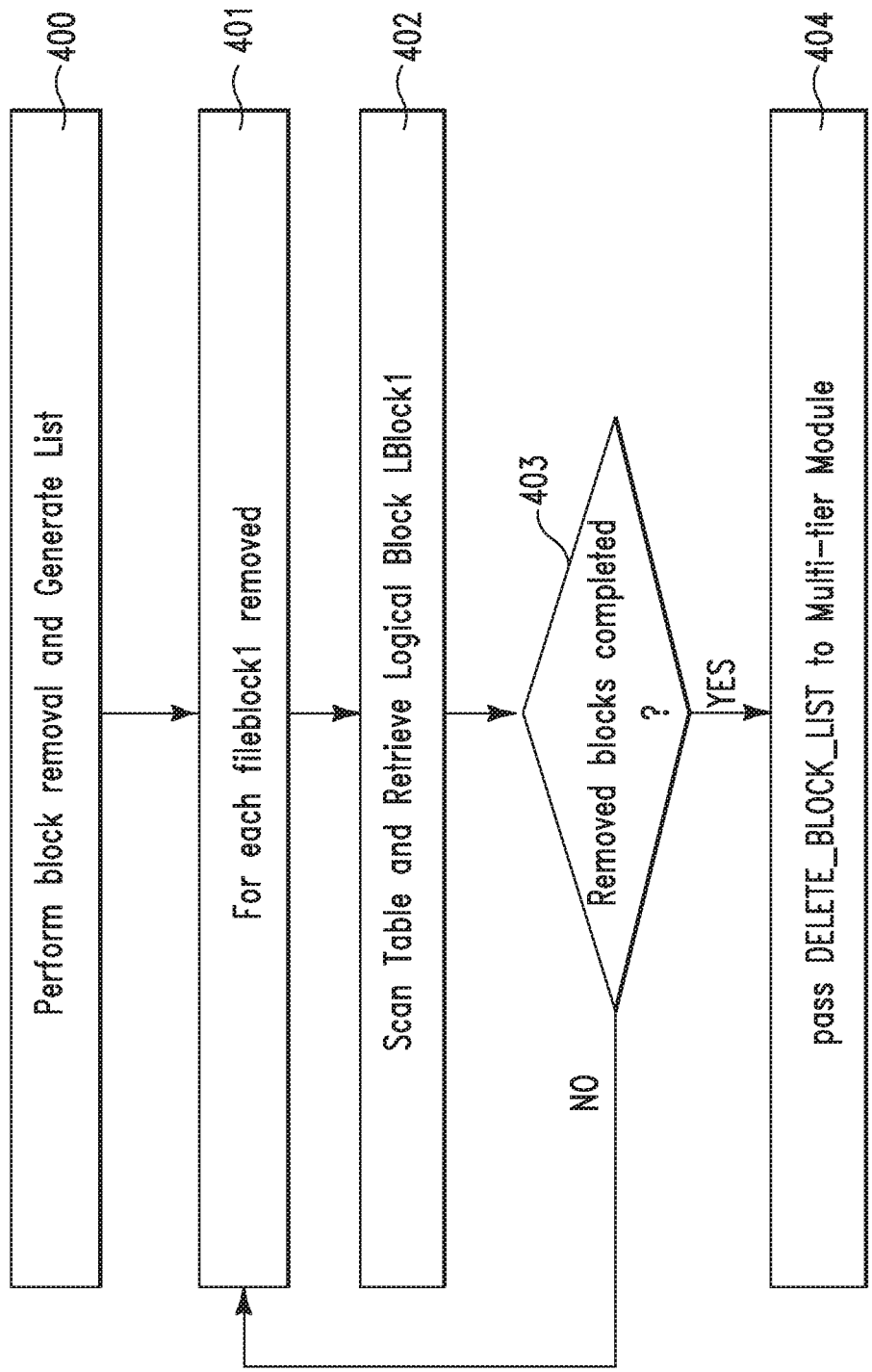
FIG. 4 illustrates an algorithm detailing a process flow executed during a file block removal process, in accordance with embodiments of the present invention.

FIG. 4 illustrates an algorithm detailing a process flow executed during a file block removal process, in accordance with embodiments of the present invention. Each of the steps in the algorithm of FIG. 4 may be enabled and executed in any order by a computer processor executing computer code. In step 400, program code executes a block removal process using a TRUCATE command or a DELETE_FILE_BLOCKS command with respect to File1 blocks (i.e., of table 1 of FIG. 3A) and generates an empty DELETE_BLOCK_LIST. In step 402 (for each removed fileblock1 in step 401), program code scans table 300 (of FIG. 3A) to retrieve logical block LBLOCK1 associated with given fileblock1. The program code adds LBLOCK1 to DELETE_BLOCK_LIST. In step 403, it is determined if all removed blocks have completed processing. If all removed blocks have not completed processing then step 401 is repeated for processing another removed fileblock1. If all removed blocks have completed processing then in step 404, program code passes DELETE_BLOCK_LIST to a multi-tier module using an out of band protocol.

Figure 5:
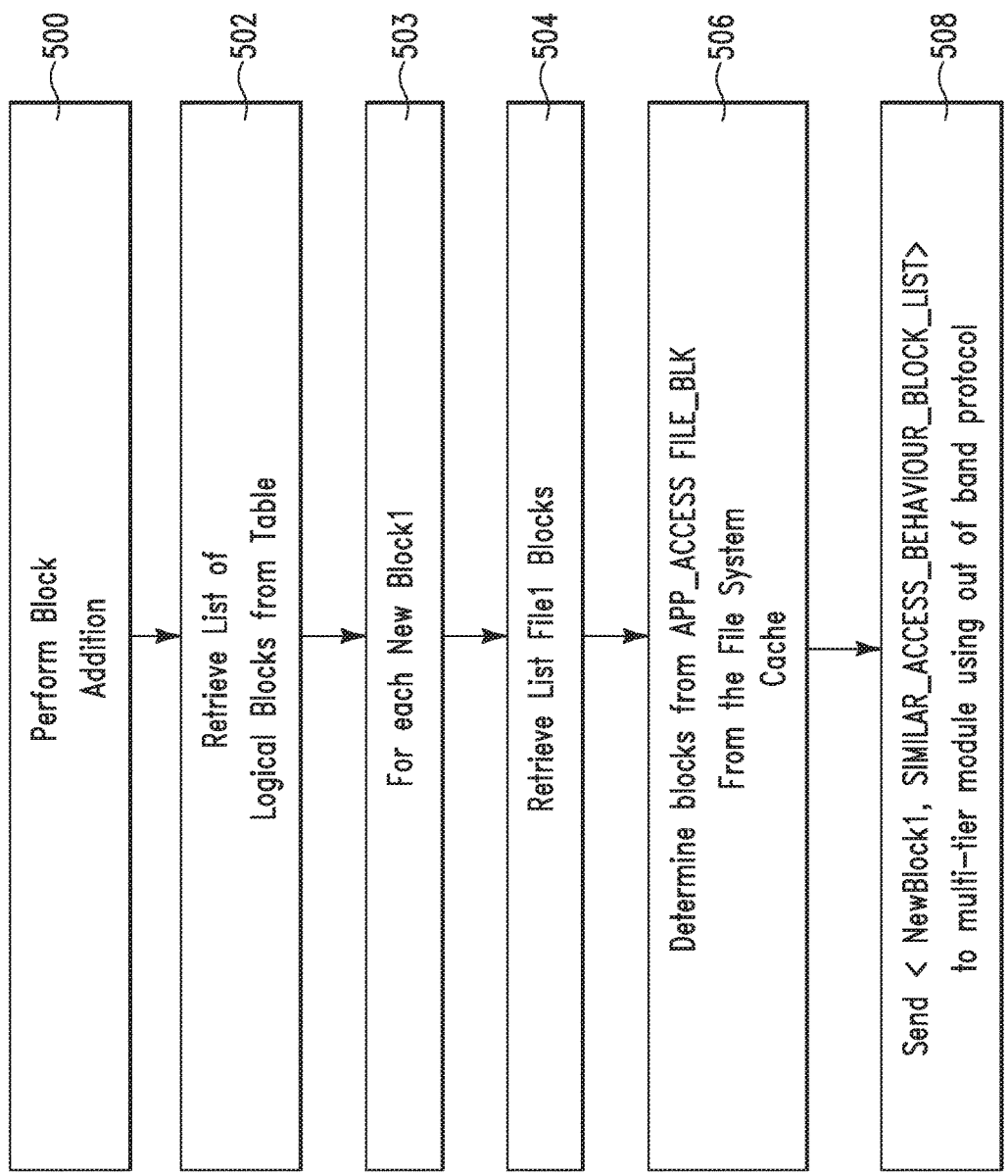
FIG. 5 illustrates an algorithm detailing a process flow executed during a file block addition process, in accordance with embodiments of the present invention.

FIG. 5 illustrates an algorithm detailing a process flow executed during a file block addition process, in accordance with embodiments of the present invention. Each of the steps in the algorithm of FIG. 5 may be enabled and executed in any order by a computer processor executing computer code. In step 500, program code executes a block addition process using an APPEND, WRITE, or ADD_FILE_BLOCKS command with respect to File1 blocks associated with application APP1. In step 502, program code scans table1 to retrieve a list of logical blocks of ADD_BLOCK_LIST associated with newly added File1 blocks. In step 504 (for each NewBlock1 from ADD_BLOCK_LIST as per step 503), program code list File1 blocks are retrieved and accessed by APP1 and active applications accessing File1 as APP_ACCESS_FILE1_BLK list. In step 506, program code determines blocks from APP_ACCESS_FILE1_BLK accessed with NewBlock1 for a couple of accesses. SIMILAR_ACCESS_BEHAVIOUR_BLOCK_LIST is set to block list. In step 508, program code transmits <NewBlock1, SIMILAR_ACCESS_BEHAVIOUR_BLOCK_LIST> to a multi-tier module using an out of band protocol.

Figure 6:
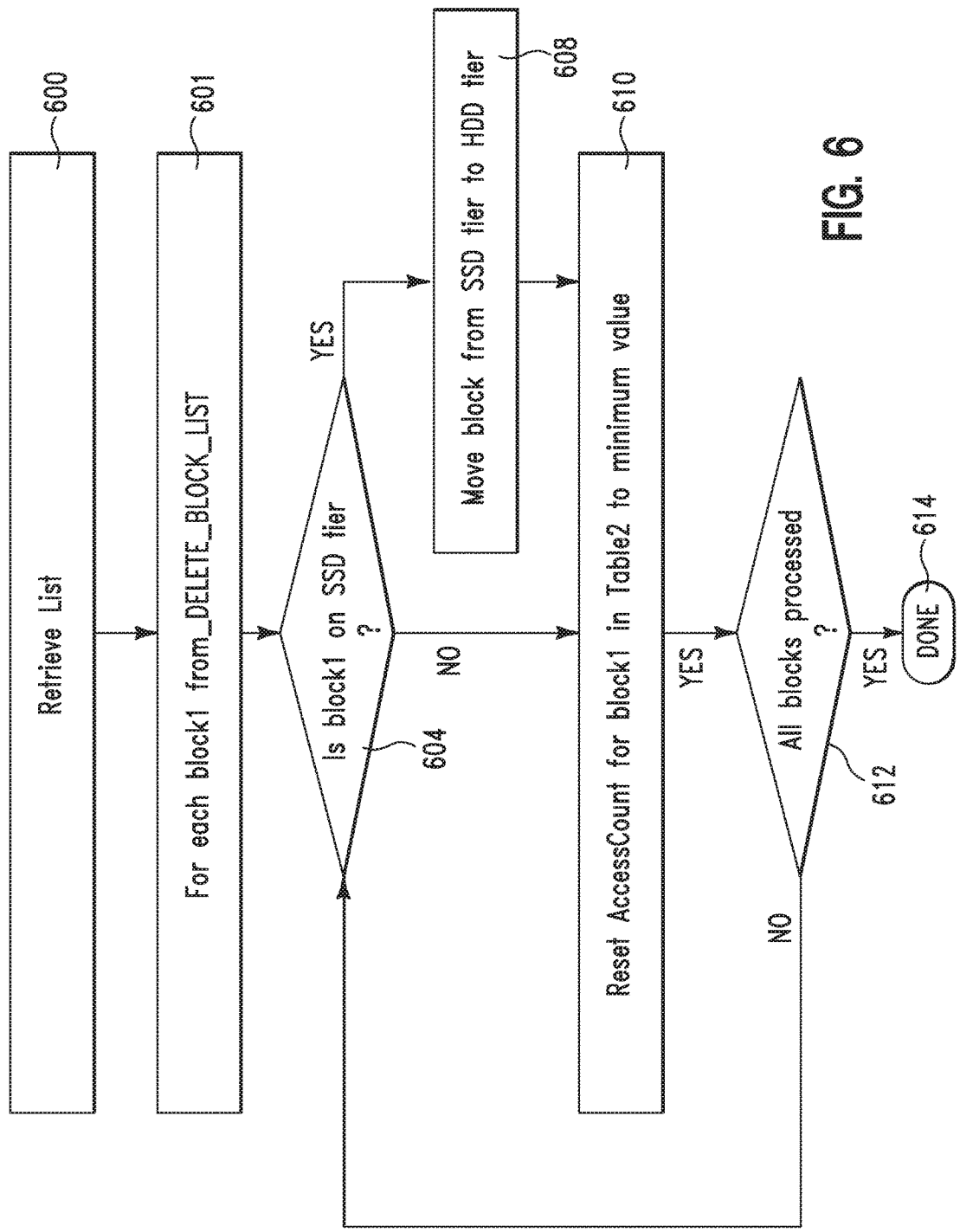
FIG. 6 illustrates an algorithm detailing a process flow executed during a multi-tier file block removal process, in accordance with embodiments of the present invention.

FIG. 6 illustrates an algorithm detailing a process flow executed during a multi-tier file block removal process, in accordance with embodiments of the present invention. Each of the steps in the algorithm of FIG. 7 may be enabled and executed in any order by a computer processor executing computer code. In step 600, program code retrieves a DELETE_BLOCK_LIST from a file system. In step 604 (for each block of the DELETE_BLOCK_LIST as per step 601), program code determines if a block is available on an SSD tier. If in step 604, the program code determines that the block is available on the SSD tier then in step 608, program code moves the block from the SSD tier to an HDD tier and step 612 is executed as described, infra. If in step 604, the program code determines that the block is not available on the SSD tier then in step 610, program code resets an access count for the block (in table 304 of FIG. 3B) to a minimum value. In step 612, program code determines if all of the blocks have been processed. If in step 612, the program code determines that all of the blocks have been processed then the process is terminated in step 614. If in step 612, the program code determines that all of the blocks have not been processed then step 604 is repeated.

Figure 7:
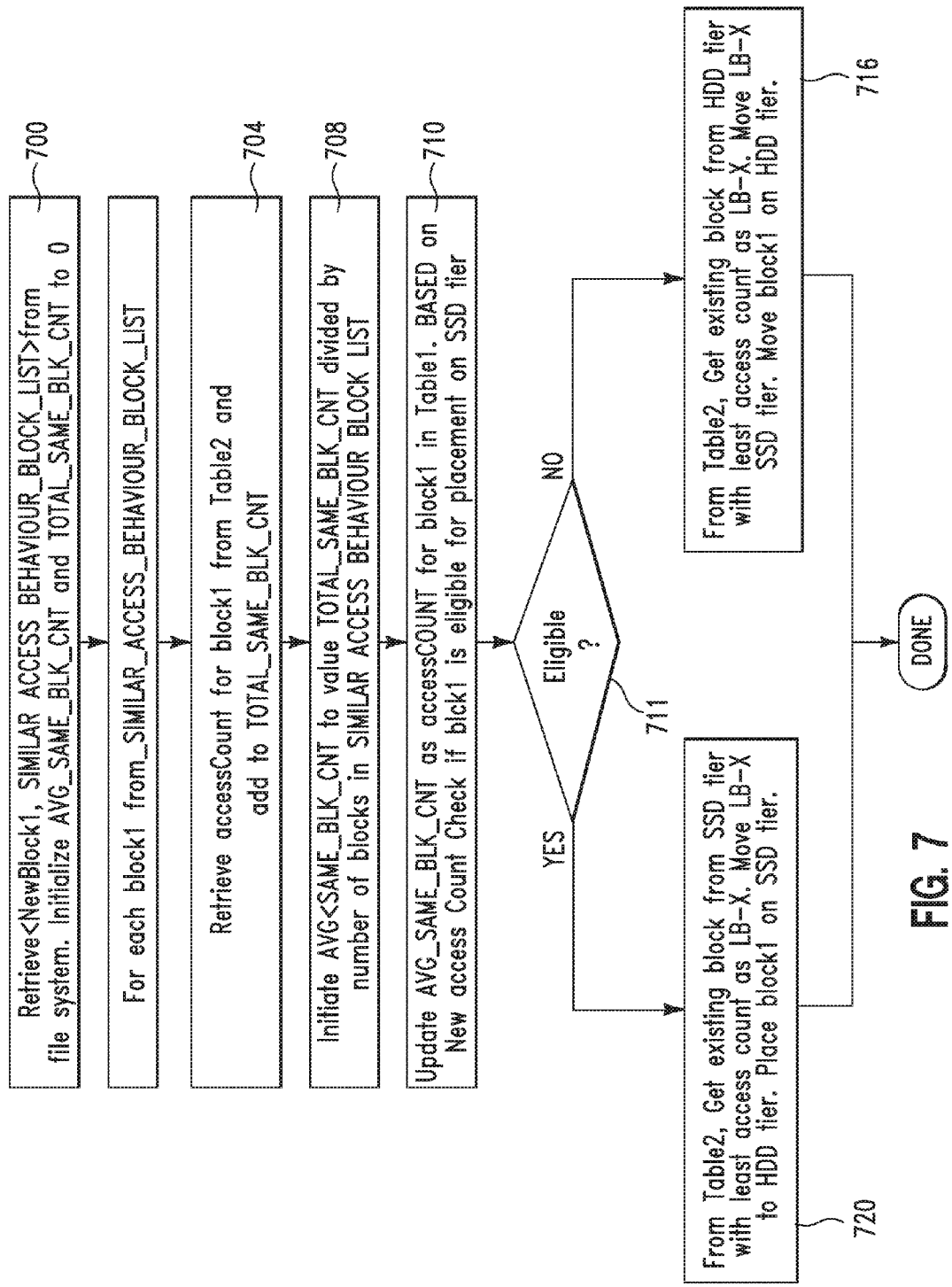
FIG. 7 illustrates an algorithm detailing a process flow executed during a multi-tier file block addition process, in accordance with embodiments of the present invention.

FIG. 7 illustrates an algorithm detailing a process flow executed during a multi-tier file block addition process, in accordance with embodiments of the present invention. Each of the steps in the algorithm of FIG. 7 may be enabled and executed in any order by a computer processor executing computer code. In step 700, program code retrieves a NewBlock, SIMILAR_ACCESS_BEHAVIOUR_BLOCK_LIST from a file system. Additionally, the program code initializes an AVG_SAME_BLK_CNT and a TOTAL_SAME_BLK_CNT to 0. In step 704 (for each block from the SIMILAR_ACCESS_BEHAVIOUR_BLOCK_LIST), program code retrieves an access count for a block (from table 304 of FIG. 3B) and adds the block to TOTAL_SAME_BLK_CNT. In step 708, program code initializes the AVG_SAME_BLK_CNT to a value: TOTAL_SAME_BLK_CNT divided by a number of blocks located within the SIMILAR_ACCESS_BEHAVIOUR_BLOCK_LIST. In step 710, program code updates the AVG_SAME_BLK_CNT as an access count for an associated block in table 300 of FIG. 3A. The update is performed based on an access count check to determine (in step 711) if the associated block is eligible for placement on an SSD tier. If the associated block is eligible for placement on the SSD tier then an existing block (i.e., with a minimum access count equal to LB-X from table 304 of FIG. 3B) is retrieved from the SSD tier. LB-X is placed on the HDD tier and the associated block is placed on the SSD tier in step 720. If the associated block is not eligible for placement on the SSD tier then an existing block (i.e., with a maximum access count equal to LB-X from table 304 of FIG. 3B) is retrieved from the SSD tier and the associated block is placed on the HDD tier in step 716.

Figure 8:
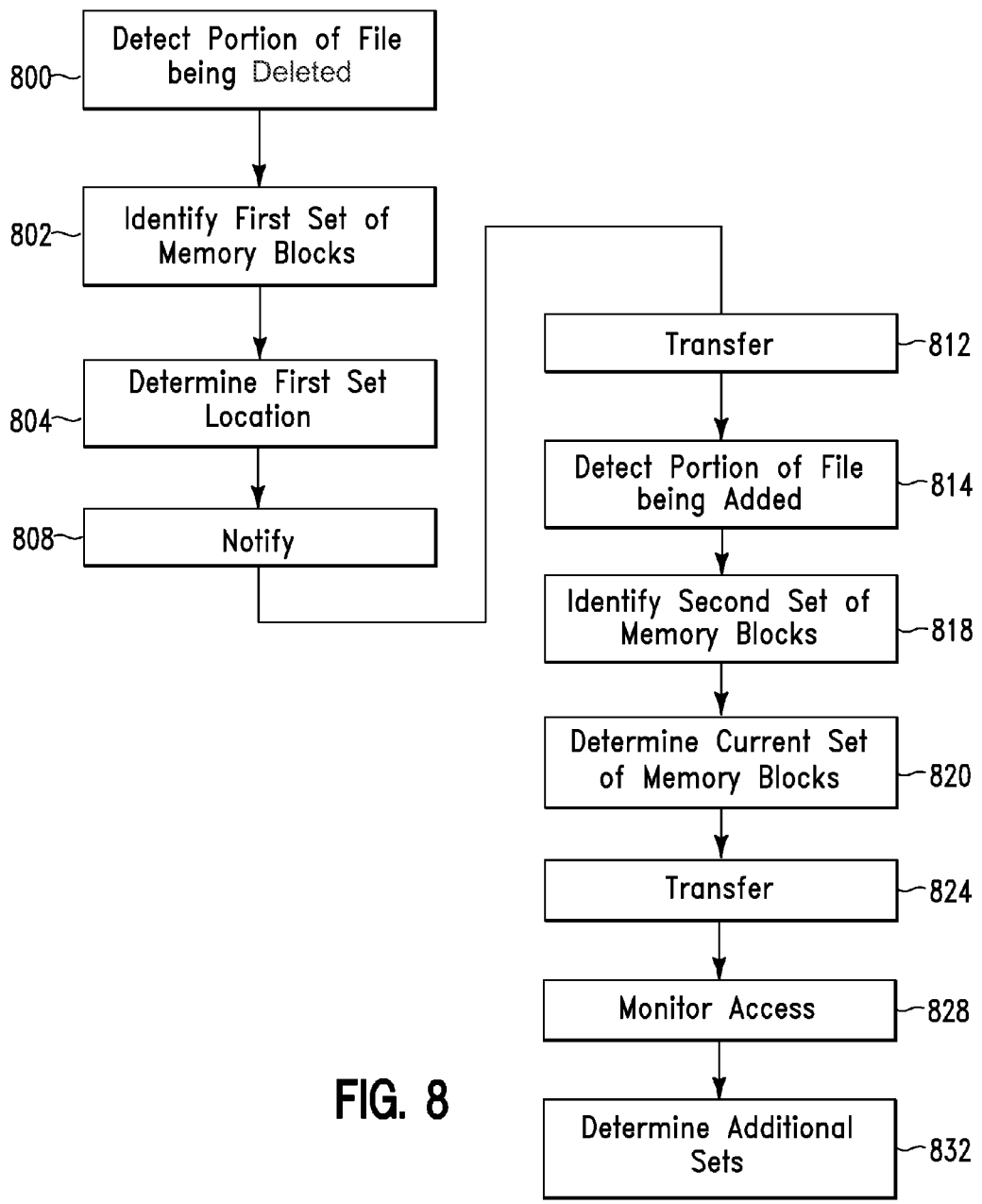
FIG. 8 illustrates an algorithm detailing a process flow for transferring memory blocks between tiers of a hybrid memory device, in accordance with embodiments of the present invention.

FIG. 8 illustrates an algorithm detailing a process flow for transferring memory blocks between tiers of a hybrid memory device, in accordance with embodiments of the present invention. Each of the steps in the algorithm of FIG. 8 may be enabled and executed in any order by a computer processor executing computer code. In step 800, program code detects a first portion of a first file being deleted from a hybrid multitier storage device comprising a hard disk drive (HDD) memory device, a solid state drive (SSD) memory device, and an archival storage memory device. In step 802, program code identifies a first set of memory blocks associated with the first portion of the first file. In step 804, program code determines that the first set of memory blocks reside on a high performance tier of the SSD memory device. In step 808, the program code notifies the hybrid multitier storage device that the first portion of the first file is being deleted. In step 812, program code transfers the first set of memory blocks from the SSD memory device to a first portion of the hybrid storage device. In step 814, program code detects a second portion of a second file being added to the hybrid storage device. In step 818, program code identifies a second set of memory blocks associated with the second portion of the second file. In step 820, program code determines (based on evaluating an application executing a process associated with the second portion of a second file being added to the hybrid storage device) a current set of existing memory blocks comprising similar access behavior with respect to the second set of memory blocks and the hybrid multitier storage device. In step 824, program code transfers the second set of memory blocks from the HDD memory device to a second portion of the hybrid storage device. In step 828, program code monitors access to additional sets of memory blocks. In step 832, program code determines additional sets of existing memory blocks being accessed during the monitoring of step 828.

Figure 9:
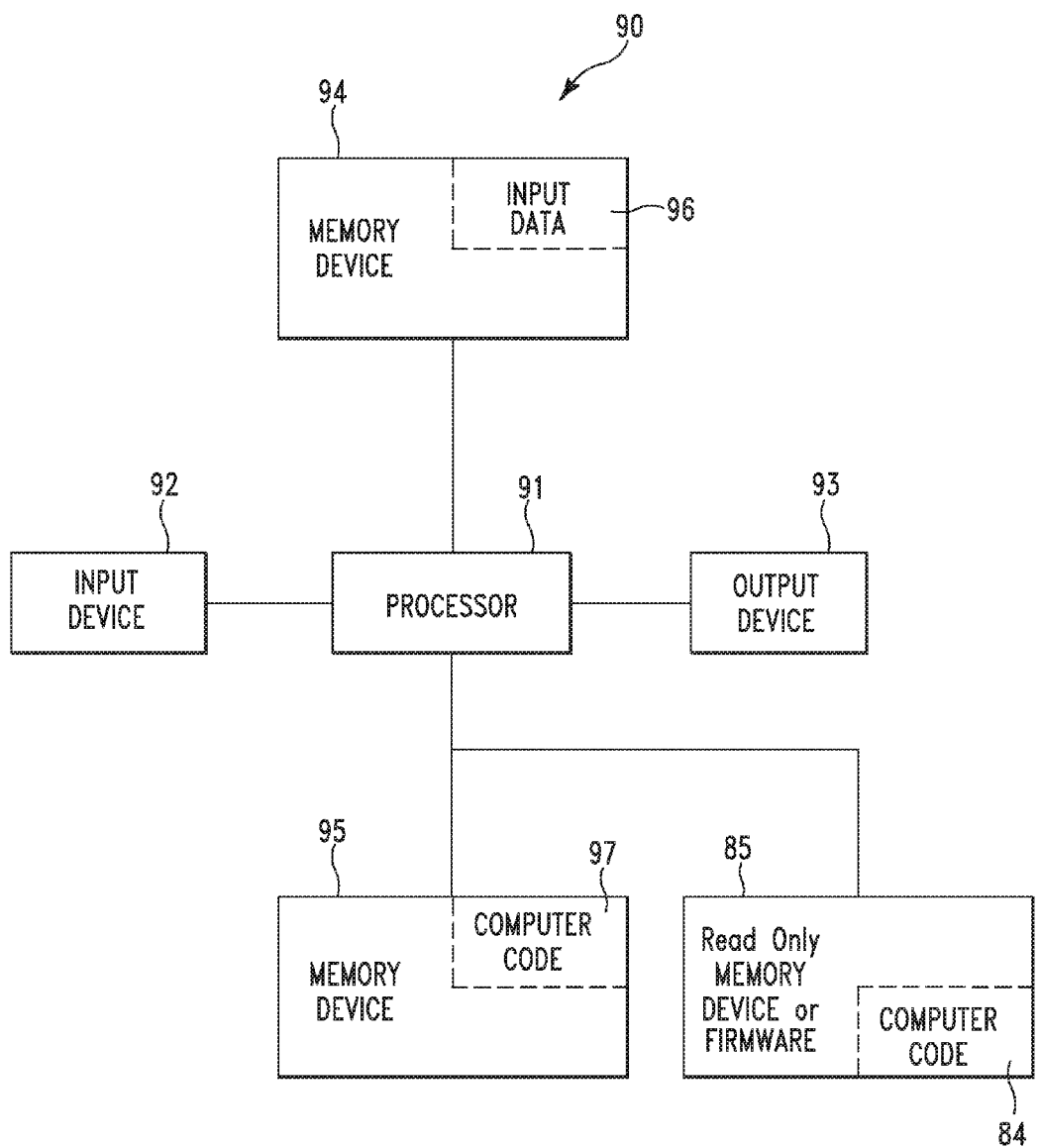
FIG. 9 illustrates a computer apparatus for transferring memory blocks between tiers of a hybrid memory device, in accordance with embodiments of the present invention.

FIG. 9 illustrates a computer apparatus 90 for transferring memory blocks between tiers of a hybrid memory device, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4-8) for transferring memory blocks between tiers of a hybrid memory device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may include the algorithms of FIGS. 4-8 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 4-8) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to transfer memory blocks between tiers of a hybrid memory device. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for transferring memory blocks between tiers of a hybrid memory device. In another embodiment, the invention provides a business method that performs the process steps of the invention on a subscription, advertising, and/or fee basis. That is, a service supplier, such as a Solution Integrator, could offer to transfer memory blocks between tiers of a hybrid memory device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hierarchal storage management method comprising:
   detecting, by a computer processor of a computing system, a first portion of a first file being deleted from a hybrid multitier storage device comprising a hard disk drive (HDD) memory device, a solid state drive (SSD) memory device, and an archival storage memory device;
   identifying, by said computer processor, a first set of memory blocks residing on a high performance tier of said SSD memory device and associated with said first portion of said first file, said first set of memory blocks comprising a first set of logical blocks mapped to a first set of physical blocks via an in memory cache device;
   transferring, by said computer processor in response to said first portion of said first file being deleted, said first set of memory blocks from said SSD memory device to a first portion of said hybrid storage device;
   detecting, by said computer processor, a second portion of a second file being added to said hybrid storage device;
   identifying, by said computer processor, a second set of memory blocks associated with said second portion of said second file, said second set of memory blocks comprising a second set of logical blocks mapped to a second set of physical blocks via said in memory cache device;
   determining, by said computer processor based on evaluating an application executing a process associated with said second portion of said second file being added to said hybrid storage device, a current set of existing memory blocks comprising similar access behavior with respect to said second set of memory blocks and said hybrid multitier storage device;
   determining, by said computer processor, an access count for said second set of memory blocks;
   comparing, by said computer processor, said access count to a predetermined threshold;
   determining, by said computer processor in response to results of said comparing, that said access count has reached said predetermined threshold;
   transferring, by said computer processor in response to said determining that said access count has reached said predetermined threshold, said second set of memory blocks from said HDD memory device to a second portion of said hybrid storage device; and
   resetting, by said computer processor, said access count to a minimum value.

2. The method of claim 1, wherein said first portion of said hybrid storage device is comprised by said HDD memory device.

3. The method of claim 1, wherein said first portion of said hybrid storage device is comprised by said archival storage memory device.

4. The method of claim 1, further comprising:
   monitoring, by said computer processor, access to additional sets of memory blocks; and
   determining, by said computer processor, additional sets of existing memory blocks being accessed during said monitoring.

5. The method of claim 1, wherein said second portion of said hybrid storage device is comprised by said SSD memory device.

6. The method of claim 1, wherein said second portion of said hybrid storage device is comprised by said archival storage memory device.

7. The method of claim 1, wherein said first file differs from said second file.

8. The method of claim 1, wherein said first file comprises a same file as said second file.

9. The method of claim 1, further comprising:
   providing at least one support service for at least one of creating, integrating, hosting, maintaining, and deploying computer-readable code in the computing system, said code being executed by the computer processor to implement said detecting said first portion of said first file, said identifying said first set of memory blocks, said transferring said first set of memory blocks, said detecting said second portion, said identifying said second set of memory blocks, said determining said current set, said determining said access count, said comparing said access count, said determining that said access count has reached said predetermined threshold, said transferring said second set of memory blocks, and said resetting.

10. A computing system comprising a computer processor coupled to a computer-readable memory unit, said memory unit comprising instructions that when executed by the computer processor implements a method comprising:
   detecting, by said computer processor, a first portion of a first file being deleted from a hybrid multitier storage device comprising a hard disk drive (HDD) memory device, a solid state drive (SSD) memory device, and an archival storage memory device;

identifying, by said computer processor, a first set of memory blocks residing on a high performance tier of said SSD memory device and associated with said first portion of said first file, said first set of memory blocks comprising a first set of logical blocks mapped to a first set of physical blocks via an in memory cache device;

transferring, by said computer processor in response to said first portion of said first file being deleted, said first set of memory blocks from said SSD memory device to a first portion of said hybrid storage device;

detecting, by said computer processor, a second portion of a second file being added to said hybrid storage device;

identifying, by said computer processor, a second set of memory blocks associated with said second portion of said second file, said second set of memory blocks comprising a second set of logical blocks mapped to a second set of physical blocks via said in memory cache device;

determining, by said computer processor based on evaluating an application executing a process associated with said second portion of said second file being added to said hybrid storage device, a current set of existing memory blocks comprising similar access behavior with respect to said second set of memory blocks and said hybrid multitier storage device;

determining, by said computer processor, an access count for said second set of memory blocks;

comparing, by said computer processor, said access count to a predetermined threshold;

determining, by said computer processor in response to results of said comparing, that said access count has reached said predetermined threshold;

transferring, by said computer processor in response to said determining that said access count has reached said predetermined threshold, said second set of memory blocks from said HDD memory device to a second portion of said hybrid storage device; and resetting, by said computer processor, said access count to a minimum value.

11. The computing system of claim 10, wherein said first portion of said hybrid storage device is comprised by said HDD memory device.

12. The computing system of claim 10, wherein said first portion of said hybrid storage device is comprised by said archival storage memory device.

13. The computing system of claim 10, wherein said method further comprises:
    monitoring, by said computer processor, access to additional sets of memory blocks; and
    determining, by said computer processor, additional sets of existing memory blocks being accessed during said monitoring.

14. The computing system of claim 10, wherein said second portion of said hybrid storage device is comprised by said SSD memory device.

15. The computing system of claim 10, wherein said second portion of said hybrid storage device is comprised by said archival storage memory device.

16. The computing system of claim 10, wherein said first file differs from said second file.

17. The computing system of claim 10, wherein said first file comprises a same file as said second file.

18. A computer program product for software installation, the computer program product comprising:
    one or more computer-readable, tangible computer readable storage medium;

program instructions, stored on at least one of the one or more computer readable storage medium, to detect a first portion of a first file being deleted from a hybrid multitier storage device comprising a hard disk drive (HDD) memory device, a solid state drive (SSD) memory device, and an archival storage memory device;

program instructions, stored on at least one of the one or more computer readable storage medium, to identify a first set of memory blocks residing on a high performance tier of said SSD memory device and associated with said first portion of said first file, said first set of memory blocks comprising a first set of logical blocks mapped to a first set of physical blocks via an in memory cache device;

program instructions, stored on at least one of the one or more computer readable storage medium, to transfer, in response to said first portion of said first file being deleted, said first set of memory blocks from said SSD memory device to a first portion of said hybrid storage device;

program instructions, stored on at least one of the one or more computer readable storage medium, to detect a second portion of a second file being added to said hybrid storage device;

program instructions, stored on at least one of the one or more computer readable storage medium, to identify a second set of memory blocks associated with said second portion of said second file, said second set of memory blocks comprising a second set of logical blocks mapped to a second set of physical blocks via said in memory cache device;

program instructions, stored on at least one of the one or more computer readable storage medium, to determine based on evaluating an application executing a process associated with said second portion of said second file being added to said hybrid storage device, a current set of existing memory blocks comprising similar access behavior with respect to said second set of memory blocks and said hybrid multitier storage device;

program instructions, stored on at least one of the one or more computer readable storage medium, to determine an access count for said second set of memory blocks;

program instructions, stored on at least one of the one or more computer readable storage medium, to compare said access count to a predetermined threshold;

program instructions, stored on at least one of the one or more computer readable storage medium, to determine in response to results of comparing said access count to said predetermined threshold, that said access count has reached said predetermined threshold;

program instructions, stored on at least one of the one or more computer readable storage medium, to transfer in response to determining that said access count has reached said predetermined threshold, said second set of memory blocks from said HDD memory device to a second portion of said hybrid storage device; and program instructions, stored on at least one of the one or more computer readable storage medium, to reset said access count to a minimum value.

19. The computer program product of claim 18, wherein said first portion of said hybrid storage device is comprised by said archival storage memory device.

20. The computer program product of claim 18, wherein said first file comprises a same file as said second file.

* * * * *